United States Patent
Takiguchi

(10) Patent No.: US 8,275,103 B2
(45) Date of Patent: Sep. 25, 2012

(54) COMMUNICATION DEVICE, DISPLAYING METHOD AND COMPUTER READABLE MEDIUM

(75) Inventor: Toshinobu Takiguchi, Daito (JP)

(73) Assignee: Kyocera Corporation, Kyoto (JP)

( * ) Notice: Subject to any disclaimer, the term of this patent is extended or adjusted under 35 U.S.C. 154(b) by 442 days.

(21) Appl. No.: 12/554,678

(22) Filed: Sep. 4, 2009

(65) Prior Publication Data

US 2010/0061532 A1  Mar. 11, 2010

(30) Foreign Application Priority Data

Sep. 8, 2008 (JP) ................................ 2008-230331

(51) Int. Cl.
 *H04M 1/56* (2006.01)
(52) U.S. Cl. .............................. 379/142.06; 455/414.1
(58) Field of Classification Search ................ 379/67.1, 379/142.06; 455/415
See application file for complete search history.

(56) References Cited

U.S. PATENT DOCUMENTS

| | | | | |
|---|---|---|---|---|
| 6,088,696 | A * | 7/2000 | Moon et al. ................... | 1/1 |
| 6,681,004 | B2 * | 1/2004 | Gutta et al. ............... | 379/142.06 |
| 7,035,622 | B2 * | 4/2006 | Pappalardo et al. ....... | 455/412.1 |
| 7,280,652 | B2 * | 10/2007 | Bocking et al. ............ | 379/355.02 |
| 7,283,813 | B2 * | 10/2007 | Hamanaga et al. ............ | 455/415 |
| 8,055,707 | B2 * | 11/2011 | Desai et al. ................. | 709/204 |
| 2007/0123206 | A1 * | 5/2007 | Satake et al. ................ | 455/403 |

FOREIGN PATENT DOCUMENTS

| | | |
|---|---|---|
| JP | 11-275209 | 10/1999 |
| JP | 2000-184044 | 6/2000 |
| JP | 2002-190860 | 7/2002 |
| JP | 2008-022241 | 1/2008 |

OTHER PUBLICATIONS

Office Action from Japanese Patent Application No. 2008-230331, mailed on Oct. 26, 2010.
Office Action from Japanese Patent Application No. 2008-230331, mailed on Aug. 3, 2010.

\* cited by examiner

*Primary Examiner* — Yuwen Pan
*Assistant Examiner* — Assad Mohammed
(74) *Attorney, Agent, or Firm* — Duane Morris LLP; Richard C. Kim

(57) ABSTRACT

A system and method for selecting callers on a communication device is disclosed. When a call is received from a caller, call history data are obtained from a call history database, and presented on a display. A user may then decide based on the call history whether to receive the call.

10 Claims, 9 Drawing Sheets

COMMUNICATION DEVICE, DISPLAYING METHOD AND COMPUTER READABLE MEDIUM

CROSS-REFERENCE TO RELATED APPLICATION

The present application claims priority under 35 U.S.C. §119 to Japanese Patent Application No. 2008-230331, filed on Sep. 8, 2008, entitled "COMMUNICATION DEVICE, METHOD OF DISPLAYING COMMUNICATION RECORD AND PROGRAM OF DISPLAYING COMMUNICATION RECORD". The content of which is incorporated herein by reference in its entirety.

FIELD OF THE INVENTION

Embodiments of the present invention relate generally to communication devices, and more particularly relate to a communication device comprising a storage module which stores a communication history of callers.

BACKGROUND

In recent years, a mobile phone can store a phonebook in which a phone number is associated with a name. The mobile phone displays information registered in the phonebook, such as callers' names and phone numbers of their outgoing calls or incoming calls. Callers may be registered in the phonebook during transmitting an outgoing call or receiving an incoming call. However, if the outgoing calls to the callers or the incoming calls from the callers are from non-registered callers in the phonebook, information other than the callers' phone numbers cannot be displayed.

If an incoming call is from a phone number not registered in the phonebook, a standard register name is automatically assigned to the phone number and the standard register name can be registered in the phonebook. In this manner, many phone numbers can be automatically registered in the phonebook. This may waste memory resources. More particularly, since an amount of memory allocated for the phonebook is usually limited, a new phone number cannot be registered in the phonebook if the memory size is deficient. The standard register name can be displayed during receiving a call after the name is registered in the phonebook; however, a user who receives the call will not have customized information or descriptions of the caller. Accordingly, there is a need for methods to provide custom information and mnemonics for a caller during a communication.

SUMMARY

A system and method for selecting callers on a communication device is disclosed. When a call is received from a caller, call history data are obtained from a call history database, and presented on a display. The user may then decide based on the call history whether to receive the call.

A first embodiment comprises a communication device. The communication device comprises a memory module operable to store a set of call history information which comprises a set of identification information of the callers in the past. The communication device further comprises an extraction module operable to access the set of call history information related to at least one of the callers in the past stored in the storage module during a phone call. The communication device also comprises a display module operable to display the extracted history information thereon.

A second embodiment comprises a method for displaying communication history information. The method comprises storing a set of call history information comprising a set of identification information of callers in the past in a storage module. The method further comprises extracting a subset of the set of call history information related to at least one of the callers in the past, stored in the memory module during a phone call, from the set of call history information, and displaying the extracted history information on a display.

A third embodiment comprises a computer readable medium comprising program code. The program code stores a set of communication history information comprising a set of identification information of callers in the past in a memory module. The program code extracts a subset of the set of call history information related to at least one of the callers in the past, stored in the memory module during a phone call, from the set of communication history information in the memory module, and displays the extracted history information on a display.

BRIEF DESCRIPTION OF THE DRAWINGS

Embodiments of the present invention are hereinafter described in conjunction with the following figures, wherein like numerals denote like elements. The figures are provided for illustration and depict exemplary embodiments of the invention. The figures are provided to facilitate understanding of the invention without limiting the breadth, scope, scale, or applicability of the invention. The drawings are not necessarily made to scale.

DETAILED DESCRIPTION OF EXEMPLARY EMBODIMENTS

The following description is presented to enable a person of ordinary skill in the art to make and use the embodiments of the invention. The following detailed description is exemplary in nature and is not intended to limit the invention or the application and uses of the embodiments of the invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present invention should be accorded scope consistent with the claims, and not limited to the examples described and shown herein.

Embodiments of the invention are described herein in the context of practical non-limiting applications, namely, a call reception on a mobile phone. Embodiments of the invention, however, are not limited to such mobile phone applications, and the techniques described herein may also be utilized in other communication applications. For example, embodiments may be applicable to a landline phone and the like.

As would be apparent to one of ordinary skill in the art after reading this description, these are merely examples and the embodiments of the invention are not limited to operating in accordance with these examples. Other embodiments may be utilized and structural changes may be made without departing from the scope of the exemplary embodiments of the present invention.

Figure 1:
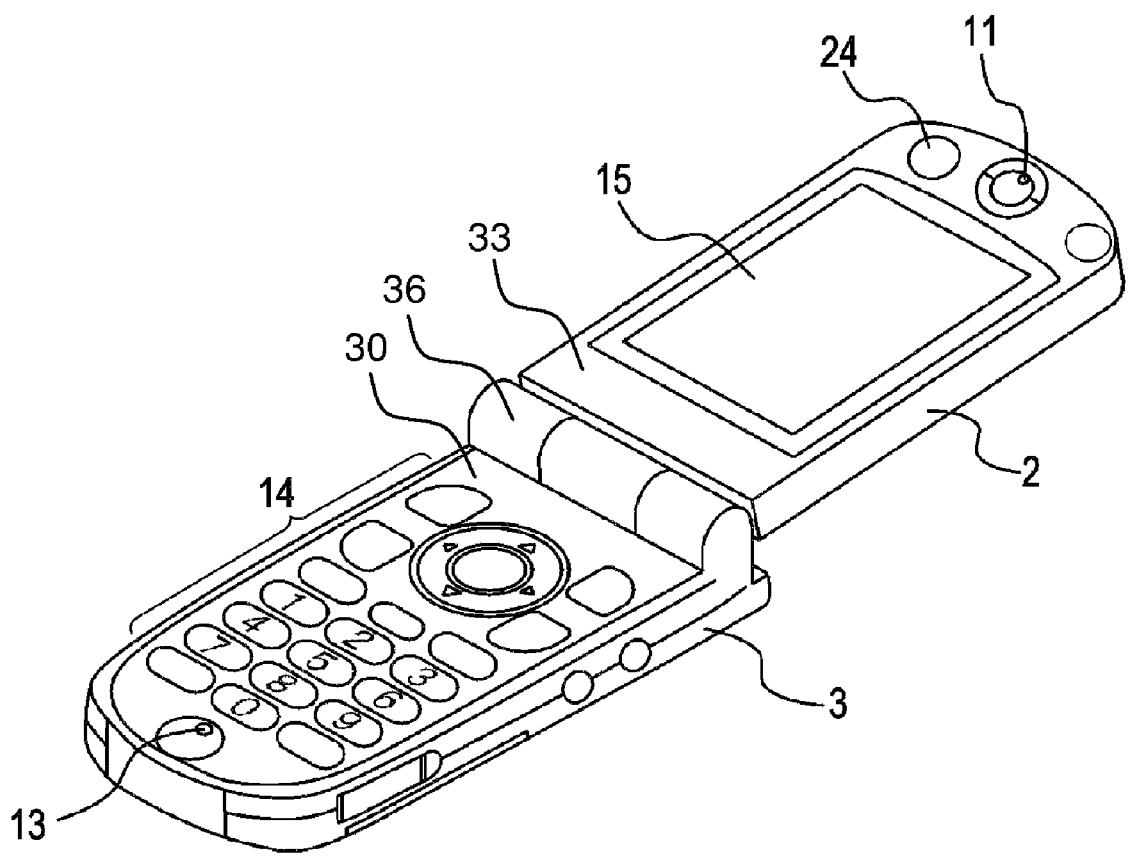
FIG. 1 illustrates a perspective view of a mobile phone in an open state according to an embodiment of the present invention.

FIG. 1 illustrates a perspective view of a mobile phone 1 in an open state according to an embodiment of the present invention. The mobile phone 1 is a communication device comprising an operation module 3 and a display module 2. The operation module 3 comprises an operational keypad 14 comprising numeric keys and phone control keys and a microphone 13, both of which are arranged on a first internal surface 30. The display module 2 comprises a liquid crystal display (LCD) 15, a speaker 11 comprising a receiver, and a camera 24, arranged on a second internal surface 33. The operation module 3 and the display module 2 are rotatably coupled via a hinge mechanism 36. The operation module 3 and the display module 2 can be in open state or a close state module. When the mobile phone 1 is folded the operation module 3 and the display module 2 are in the closed state referred to as a close style. When the mobile phone 1 is opened the operation module 3 and the display module 2 are in the open state referred to as an open style.

Figure 2:
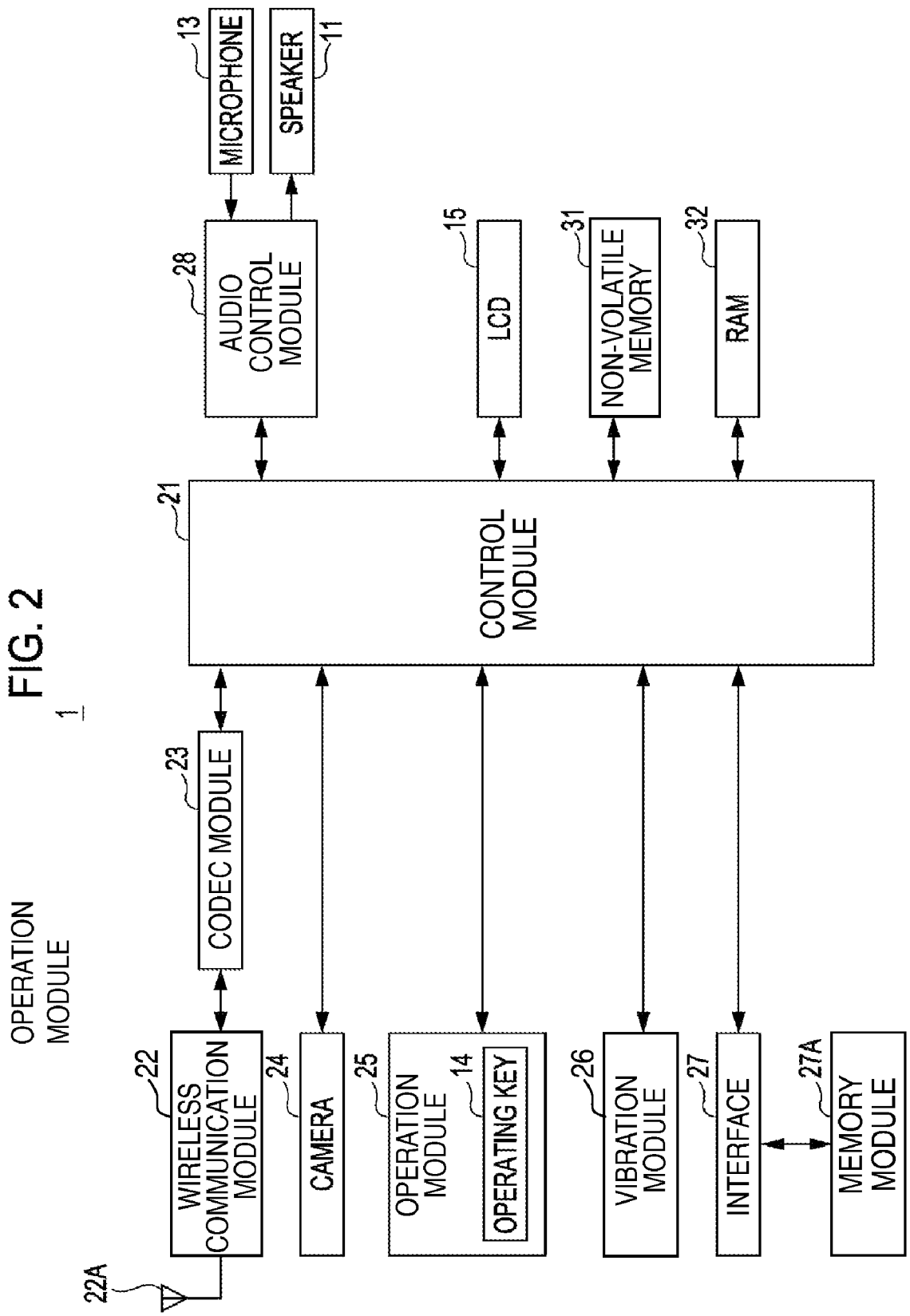
FIG. 2 illustrates a schematic system block diagram of a mobile phone according to an embodiment of the present invention.

FIG. 2 illustrates a schematic system block diagram of the mobile phone 1 according to an embodiment of the present invention. The mobile phone 1 may comprise: a control module 21 for controlling operation of the mobile phone 1, a wireless communication module 22 connected to an antenna 22A, a codec module 23 for coding or decoding audio data, an audio control module 28 for processing audio data and for controlling volume, a camera 24, an operation module 25 for accepting an input of an operation from a user, a vibration module 26 for informing the user of an incoming call, a display module 2 for displaying displays various information and images, a non-volatile memory 31 for storing programs executed by the control module 21, a random access memory (RAM) 32 used as a work area of the control module 21, and an interface 27.

The wireless communication module 22 is controlled by the control module 21 and communicates with a radio base station. More specifically, a radio signal received from the antenna 22A is provided to the wireless communication module 22 and the wireless communication module 22 outputs an audio signal demodulated from the radio signal to the codec module 23. Also, an audio signal is provided to the wireless communication module 22 from the codec module 23 and the wireless communication module 22 outputs a radio signal modulated from the audio signal to the antenna 22A. The codec module 23 decodes the audio signal from the wireless communication module 22, converts a decoded digital audio signal to an analog audio signal, and outputs the converted analog audio signal to the audio control module 28. In addition, an analog audio signal is provided to the codec module 23 from the audio control module 28 and the codec module 23 converts the audio signal to a digital audio signal to code, and outputs the coded audio signal to the wireless communication module 22.

The wireless communication module 22 can perform data communication with a base station. More particularly, the wireless communication module 22 can communicate with an e-mail server connected to the base station via the base station. The wireless communication module 22 receives an e-mail transmitted from the e-mail server and outputs the e-mail to the control module 21. Furthermore, the wireless communication module 22 transmits an e-mail from the control module 21 to the e-mail server. The control module 21 stores the e-mail transmitted and received to and from the e-mail server in the non-volatile memory 31.

The operation module 25 comprises the operational keypad 14. The operational keypad 14 accepts an input of an operation by a user and outputs an accepted operation to the control module 21.

The audio control module 28 is connected to the microphone 13. The microphone 13 collects sound and outputs an input analog audio signal to the audio control module 28. The audio control module 28 provides the first audio signal to the codec module 23. Also, an output audio signal is provided to the audio control module 28 from the codec module 23 and the audio control module 28 provides the output audio signal inputted from the codec module 23 to the speaker 11.

The interface 27 may comprise, for example but without limitation, a card interface for memory cards. The interface 27 may be equipped with a memory module 27A, such as, for example but without limitation, a detachable memory card. The memory module 27A comprises a non-volatile memory such as a flash memory and can store a program. The control module 21 can access the memory module 27A via the interface 27. In this embodiment, description will be made on an example in which a program for execution by the control module 21 is stored in the non-volatile memory 31; however, the program may be executed by the control module 21 by storing the program in the memory module 27A and by reading out the program from the memory module 27A.

The memory module 27A may comprise, for example but without limitation, semiconductor memories such as a flexible disk, a cassette tape, an optical disk (compact disc read only memory (CD-ROM), magnetic optical disc (MO), mini disc (MD), digital versatile disc (DVD)), an optical card, a mask read only memory (mask ROM), an erasable and programmable read only memory (EPROM), and an electronically erasable and programmable read only memory (EE- PROM), and the like. Furthermore, the control module 21 may download a program from a computer connected to the Internet via the wireless communication module 22, and execute the program. The program may comprise, for example but without limitation, a program directly executable by the control module 21, a source program, a compressed program, an encrypted program, and the like.

The camera 24 comprises a lens and a photoelectric conversion element such as a complementary metal oxide semiconductor (CMOS) sensor; light collected by the lens is focused onto the CMOS sensor; and the CMOS sensor performs photoelectric conversion of the received light and outputs image data to the control module 21. The camera 24 is controlled by the control module 21; imaging is started by instruction from the control module 21, and obtained still image data or moving image data is outputted to the control module 21. The control module 21 displays the still image data or the moving image data outputted by the camera 24 on the LCD 15; or the control module 21 codes the still image data or the moving image data by a compression coding method and stores the coded still image data or the coded moving image data in the non-volatile memory 31 or the memory module 27A equipped with the interface 27.

The display module 2 is constructed by using a display device, for example, a liquid crystal display (LCD) panel, an organic electroluminescence (EL) panel or the like, and displays an area corresponding to an image signal supplied from the control module 21. The display module 2 displays various information and images, for example, an incoming call history, an outgoing call history, telephone number of a received call, a call waiting telephone number, contents of a received email, contents of an outgoing email, date, time, success and failure of calls, a standby screen, and the like.

Figure 3:
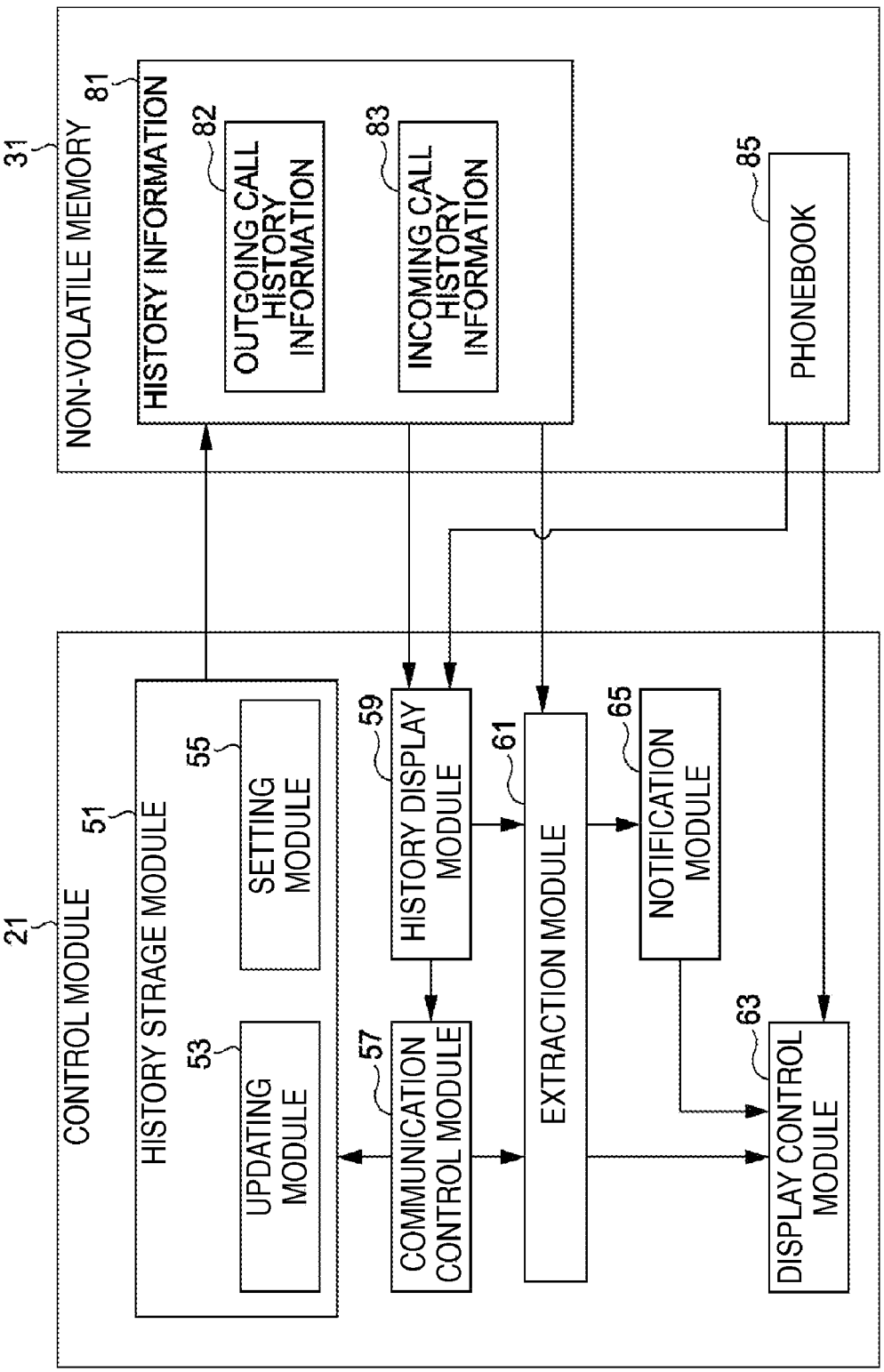
FIG. 3 illustrates a schematic system block diagram showing detail of a control module and a non-volatile module of the mobile phone shown in FIG. 2.

FIG. 3 illustrates a schematic system block diagram showing detail of the control module 21 and the non-volatile memory module 31 of the system 300 according to an embodiment of the present invention. The control module 21 may comprise a communication control module 57 for controlling incoming and outgoing calls, a history storage module 51 for storing a set of communication history information pertaining to the incoming and outgoing calls, a history display module 59 for displaying the history information, an extraction module 61 for extracting the set of communication history information, a display control module 63 for controlling display of the set of communication history information, and a notification module 65 for indicating an incoming call.

The non-volatile memory module 31 stores history information 81 and a phonebook 85. The history information 81 comprises a phone number of a receiver of an outgoing call, outgoing call history information 82, a phone number of a receiver of an outgoing call, and incoming history information 83 comprising a history of the incoming call. The outgoing call history information 82 comprises, for example but without limitation, an outgoing phone number (a phone number of a receiver of the outgoing call), an outgoing call time (a initiating time) of each outgoing call, and the number of times the outgoing call was made. A final outgoing call time is set as the outgoing call time, and the number of times the outgoing call was made until the outgoing time is set as the number of outgoing calls. The incoming call history information 83 comprises, for example but without limitation, an incoming phone number (a phone number of a caller of the incoming call), an incoming call time (a received time) of each incoming call, and the number of times the incoming call was received. A final incoming call time is set as the incoming call time, and the number of times an incoming call was made until the incoming call time is set as the number of incoming calls. Therefore, each item of the outgoing call history information 82 and the incoming call history information 83 is stored in reference to a phone number. In this case, the outgoing call history information 82 comprises the number of outgoing calls and the incoming call history information 83 comprises the number of incoming calls. The outgoing call history information 82 comprising a phone number and a initiating time of each outgoing call may be stored. Also, the incoming call history information 83 comprising a phone number and an incoming call time (a received time) of each incoming call) may be stored. The number of outgoing calls can be calculated by counting the number of outgoing calls comprising the same phone number stored in the outgoing call history information. The number of received calls can be calculated by counting the number of incoming calls comprising the same phone number stored in the incoming call history information. The phonebook 85 associates the phone number with a name of a user of a phone in which the phone number is allocated.

The communication control module 57 controls the incoming calls and the outgoing calls. When the wireless communication module 22 receives a call signal from the base station, the wireless communication module 22 outputs a phone number comprised in the call signal serving as a phone number of an incoming call to be received by the history storage module 51 and the extraction module 61. If the communication control module 57 detects that an off-hook key of the operational keypad 14 is pressed by a user of the mobile phone 1 after receiving the call signal, a network connection is established with the mobile phone 1 for the incoming call via the base station. In this manner a call is activated.

When a user of the mobile phone 1 directly inputs a phone number to the operational keypad 14, the communication control module 57 outputs the phone number to the history storage module 51 and the extraction module 61 to serve as a phone number of a receiver of the outgoing call. Furthermore, when a phone number is input from the history display module 59, as described in more detail below, the communication control module 57 outputs the outgoing phone number to the history storage module 51 and the extraction module 61. If the communication control module 57 detects that the off-hook key of the operational keypad 14 is pressed by a user after the outgoing phone number is inputted, and if the call is linked to a mobile phone of a call receiving user (at a receiving end) via the base station and a mobile phone 1 of the call receiving user answers the call, a network connection is established with the mobile phone of the call receiving user. In this manner, a call is activated.

When a phone number of the incoming call is provided from the communication control module 57 to the history storage module 51, the history storage module 51 generates a set of incoming call history information with respect to the incoming call comprising the phone number of the incoming call and stores the incoming call history information in the non-volatile memory 31. Accordingly, the incoming call history information 83 is stored in the non-volatile memory 31. When an outgoing phone number is provided from communication control module 57 to the history storage module 51, the history storage module 51 generates outgoing call history information 82 comprising the outgoing phone number and stores the outgoing call history information 82 in the non-volatile memory 31. Accordingly, the outgoing call history information 82 is stored in the non-volatile memory 31.

The history storage module 51 comprises an updating module 53 and a setting module 55. When the updating module 53 stores the generated incoming call history information in the non-volatile memory 31 and if the incoming call history information 83 comprises the same phone number as the phone number stored in the generated incoming call history information, the updating module 53 does not store the generated incoming call history information in the non-volatile memory 31. Instead, the updating module 53 changes the number of received incoming calls in the incoming call history information 83, which is already stored in the non-volatile memory 31 and comprises the same phone number as a phone number in the generated incoming call history information. The updating module 53 adds 1 to the number of received incoming calls of the same phone number, and therefore changes the number of the received incoming calls to a new number of incoming calls. The updating module 53 also changes the incoming call receiving time to the final incoming call time.

Similarly, when the updating module 53 stores the generated outgoing call history information in the non-volatile memory 31 and if the outgoing call history information 82 comprises the same phone number as the phone number included in the generated outgoing call history information, the updating module 53 does not store the generated outgoing call history information in the non-volatile memory module 31. Instead, the updating module 53 changes the number of outgoing calls in the outgoing call history information 82, which is already stored in the non-volatile memory module 31 and comprises the same phone number as a phone number in the generated outgoing call history information. Then, the updating module 53 adds 1 to the number of outgoing calls of the same phone number, and changes the number of the outgoing calls to a new number of outgoing calls. In addition, the updating module 53 changes the outgoing call time to the final outgoing call time.

When a phone call which connects a network to another phone is completed by the communication control module 57, the setting module 55 displays an additional information setting screen for inputting additional information on the LCD 15, and accepts additional information which a user inputs into the operational keypad 14. The additional information may be used as long as the information is necessary for a user to identify a caller or requirements, is previously defined, or is directly inputted by the user. Following is an example in which the additional information is previously defined.

Figure 4:
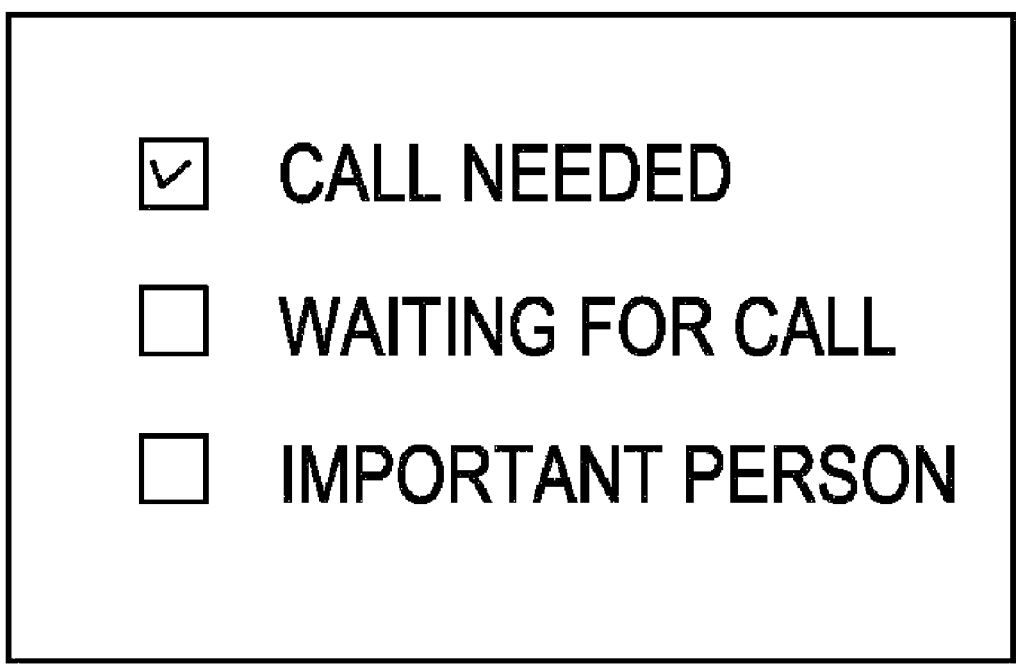
FIG. 4 illustrates a view of an exemplary additional information setting screen.

FIG. 4 illustrates a view of an exemplary additional information setting screen. The additional information setting screen 400 list-displays (or displays a list of) a plurality of types of additional information and accepts at least one selection of the list-displayed of the plurality of types of additional information. The additional information setting screen 400 displays additional information such as, but without limitation, "necessary for a call" showing that a calling is required, "wait for a call" showing a wait state that receives a call, and "important person" showing that the caller is an important person. In this example, the additional information is previously defined; however, the additional information may also be input from the operational keypad 14 by a user at any time.

Returning to FIG. 3, in a state where the additional information setting screen is displayed on the LCD 15, if the user operates the operational keypad 14 to input instruction for selecting at least one of a plurality of types of additional information "necessary for a call", "wait for a call", and "important person", the setting module 55 accepts at least one selected type of additional information and places the at least one selected type of additional information in the history information 81. The additional information in the present invention is not limited to these three; but, other additional information can be appropriately used. More specifically, in the case where the communication control module 57 completes a phone call started by the user, the outgoing call history information 82 comprising a phone number of a receiver of the outgoing call is newly stored or updated by the update module 53; however, the setting module 55 adds additional information to the newly stored or updated outgoing call history information 82 and stores same. In addition, if the communication control module 57 completes a phone call started after receiving, the incoming call history information 83 comprising a phone number of the caller of the incoming call is newly stored or updated by the updating module 53; however, the updating module 53 adds additional information to the newly stored or updated incoming call history information 83 and stores same.

After the phone call started by calling or the phone call received is completed, the additional information in which the user inputs is added to the outgoing call history information 82 or the incoming call history information 83 and is stored and therefore, the user can store information related to the caller of the phone call serving as additional information in association with the outgoing call history information 82 or the incoming call history information 83 which comprises a phone number of the caller. Therefore, the phone number of the caller of the phone call does not need to register in the phonebook 85, and information related to the caller of the phone call can be stored in the mobile phone 1 in association with the phone number immediately after the completion of the phone call. In addition, the additional information is stored immediately after the completion of the phone call; and therefore, the user does not miss an opportunity to associate the additional information with the phone number. Furthermore, even when the user forgets a relationship between the phone number and a caller of the phone call after the completion of the phone call, the user can be reminded of the caller or the receiver of the phone from the additional information and can specify the phone number.

When the phone number of the caller of the incoming call is inputted to the extraction module 61 from the communication control module 57, the extraction module 61 reads out the incoming call history information 83 comprising the inputted phone number and outputs same to the display control module 63 and the notification module 65. Conditional upon that the incoming call history information 83 comprising the phone number of the caller of the incoming call, the phone number being inputted from the communication control module 57, is not stored in the non-volatile memory module 31, the extraction module 61 reads out the outgoing call history information 82 comprising the phone number of the caller of the incoming call, the phone number being inputted from the communication control module 57, and outputs the same to the display control module 63 and the notification module 65. The incoming call history information 83 is extracted in preference to the outgoing call history information 82 to reduce a searching process load in the control module 21. The number of incoming calls from a phone number not registered in the phonebook is generally larger than that of outgoing calls to a phone number not registered in the phonebook. In other words, it is rare to call an unknown caller, but common to receive a call from an unknown caller.

When history display instruction is inputted to the operational keypad 14 by the user, the history display module 59 reads out the history information 81 and list-displays the read out history information 81 on the LCD 15. When history display instruction of an outgoing call history is inputted to the operational keypad 14 by the user, the history display module 59 reads out the outgoing call history information 82, rearranges the read out information in a sequence of a outgoing call time, and list-displays the rearranged information.

The outgoing call history information 82 comprises the phone number of each phone call, each outgoing call time, and the number of outgoing calls. If additional information is added in the outgoing call history information 82, the history display module 59 displays the additional information. If the outgoing call history information 82 is displayed on the LCD 15, and when instruction for selecting one of the outgoing call history information 82 is inputted to the operational keypad 14 by the user, the history display module 59 outputs the phone number comprised in the selected outgoing call history information 82 to the extraction module 61 and the communication control module 57.

In addition, when the history display instruction of a incoming call history is inputted to the operational keypad 14 by the user, the history display module 59 reads out the incoming call history information 83, rearranges the read out information in a sequence of a received time, and list-displays the rearranged information. The incoming call history information 83 comprises the phone number of the caller of the incoming call, received time, and the number of received times. In the case where additional information is added in the incoming call history information 83, the history display module 59 displays the additional information. When the list of the incoming call history information 83 is displayed on the LCD 15, and when instruction for selecting one of the incoming call history information 83 is inputted to the operational keypad 14 by the user, the history display module 59 outputs the phone number comprised in the selected incoming call history information 83 to the extraction module 61 and the communication control module 57.

Further, when the phone number is inputted to the extraction module 61 from the history display module 59, the extraction module 61 reads out the incoming call history information 83 comprising the inputted phone number and the outgoing call history information 82 comprising the inputted phone number, and outputs the read out incoming call history information 83 and the outgoing call history information 82 to the display control module 63 and the notification module 65. In the case where the history display module 59 list-displays the incoming call history information 83, the phone number of the caller of the incoming call, the phone number being comprised in the incoming call history information 83 selected by the user, is inputted. If the history display module 59 list-displays the outgoing call history information 82, the phone number of the receiver of the outgoing call, the phone number being comprised in the outgoing call history information 82 selected by the user, is inputted.

If the incoming call history information 83 is inputted to the display control module 63 from the extraction module 61, the display control module 63 displays the same on the LCD 15. The incoming call history information 83 comprises a final incoming call time and the number of times received until that time; and therefore, the received time and the number of received times can be notified to the user. Therefore, in order to remind the user, who monitors the incoming call history information 83, of the caller of the incoming call and in order to facilitate confirmation, the received time of the incoming calls and the number of incoming calls are submitted.

In addition, when the outgoing call history information 82 is inputted to the display control module 63 from the extraction module 61, the display control module 63 displays the same on the LCD 15. The outgoing call history information 82 comprises a final outgoing call time and the number of outgoing calls until the final outgoing call. Therefore, the outgoing call time and the number of times of outgoing calls can be notified to the user. Therefore, in order to remind the user, who monitors the outgoing call history information 82, of the caller of the outgoing call and in order to facilitate confirmation, the received time of the outgoing calls and the number of outgoing calls are submitted.

The display control module 63 referred the phonebook (telephone directory) 85 stored in the non-volatile memory 31 is accessed. If the phone number comprised in the incoming call history information 83 inputted from the extraction module 61 is registered, the display control module 63 obtains a name corresponded to the phone number and displays the name at a location adjacent to a location where the incoming call history information 83 is displayed. Similarly, if the phonebook 85 stored in the non-volatile memory module 31 is accessed and the phone number comprised in the outgoing call history information 82 inputted from the extraction module 61 is registered, the display control module 63 obtains a name corresponded to the phone number and displays the name at a location adjacent to a location where the outgoing call history information 82 is displayed.

If the incoming call history information 83 is inputted to the notification module 65 from the extraction module 61, the notification module 65 determines whether or not additional information is added to the incoming call history information 83; and if the additional information is added, the additional information is notified to the user. More specifically, the notification module 65 obtains the additional information added to the incoming call history information 83 inputted from the extraction module 61 and displays the same on the display control module 63 at a location adjacent to a location where the incoming call history information 83 is displayed. Alternatively, in one embodiment, an icon or a mark previously associated with the additional information may be displayed. The icon may be, for example but limitation, a picture, a symbol, a combination thereof, and the like.

If the outgoing call history information 82 is inputted to the notification module 65 from the extraction module 61, the notification module 65 determines whether or not additional information is added to the outgoing call history information 82; and if the additional information is added, the additional information is notified to the user. More specifically, the notification module 65 obtains the additional information added to the outgoing call history information 82 inputted from the extraction module 61 and displays same on the display control module 63 at a location adjacent to a location where the outgoing call history information 82 is displayed.

In addition, if the additional information is added to the incoming call history information 83 or the outgoing call history information 82, the notification module 65 sounds a predetermined ring alert from a speaker, vibrates the vibration module 26 in a predetermined pattern, and generates an e-mail in which the phone number and the additional information are described and a predetermined e-mail address is set to a destination and sends the e-mail. In this case, a type of notification showing that the additional information is set may be set to any of the following items in the additional information, the items being pronunciation of the ring alert from the speaker, vibration by the vibration module 26, and transmission of the e-mail. In this case, the items for selecting the notification type are set in the additional information setting screen displayed by the setting module 55, and the notification type may be selected by the user in the additional information setting screen. In addition, the notification type is set as a default value; and when the setting module 55 sets the additional information to the history information, the notification type set to the default may be set in the history information as additional information.

Figure 5:
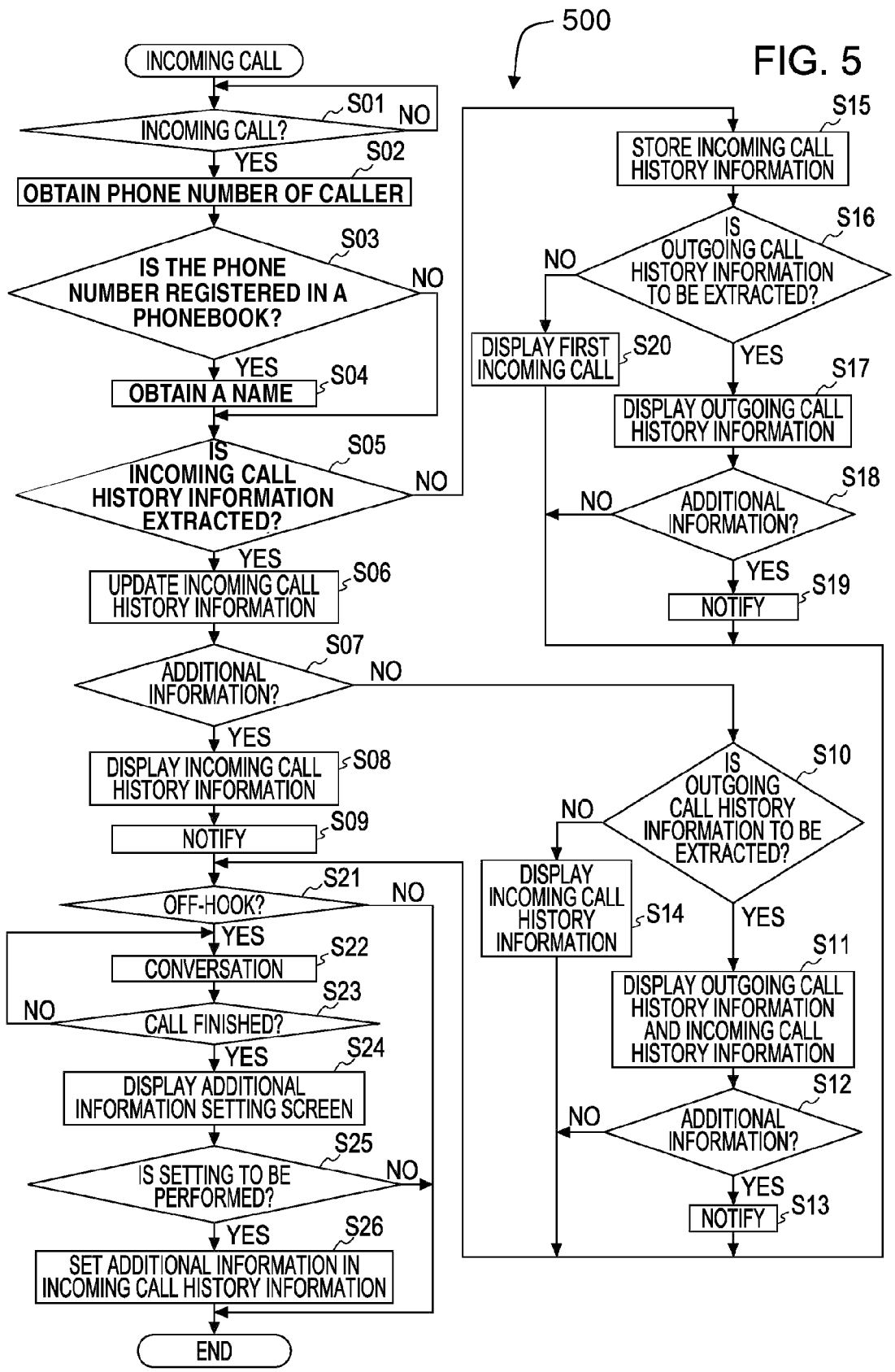
FIG. 5 is a flow chart showing an exemplary call receiving process.

When the additional information is present, the ring alert sounds, the vibration module 26 vibrates, and the e-mail is transmitted; and therefore, the notification module 65 can notify the user of the mobile phone 1 that the additional information is present with respect to a caller of the incoming call or a receiver of the outgoing call. Furthermore, the additional information, or the icon or the mark, which is provided in place of the additional information, is displayed; and therefore, a hint to remind the user of a receiver of an outgoing call or a caller of an incoming call can be given to the user from the additional information. a hint to remind the user of a caller making an incoming call FIG. 5 is a flow chart showing an exemplary call receiving process 500. The various tasks performed in connection with the process 500 may be performed by software, hardware, firmware, a computer-readable medium having computer executable instructions for performing the process method, or any combination thereof. It should be appreciated that the process 500 may include any number of additional or alternative tasks. The tasks shown in FIG. 5 need not be performed in the illustrated order, and these processes may be incorporated into a more comprehensive procedure or process having additional functionality not described in detail herein. For illustrative purposes, the following description of the process 500 may refer to elements mentioned above in connection with FIGS. 1-4. In various embodiments, portions of the process 500 may be performed by different elements of systems, e.g., the wireless communication module 22, the control module 21, and the non-volatile memory module 31. The process 500 is a process executed by the control module 21 performing a communication history display program.

The process 500 may begin by, the control module 21 determining whether or not an incoming call is detected (task S01). When a wireless communication module 22 receives a call signal from a base station, the incoming call is detected. A standby state is maintained until the incoming call is detected (NO branch of task S01). When the incoming call is detected (YES branch of task S01), the process is forwarded to task S02. That is, a receiving process is a process executed on the condition that a mobile phone 1 receives a call.

In task S02, a phone number of the incoming call is obtained as a phone number of a caller. That is, a phone number included in the call signal of the wireless communication module 22 received from the base station is obtained as a phone number of a caller of the incoming call. Then, determination is made whether or not the phone number of the caller is registered in a phonebook 85 (task S03). If the phone number of the caller is registered in the phonebook 85, the process is forwarded to task S04; however, if not, task S04 is skipped, and the process is forwarded to task S05. In task S04, in the phonebook 85, a name associated with the phone number of the caller which is obtained in task S02 is obtained, and the process is forwarded to task S05.

In task S05, the incoming call history information 83 is searched, and determination is made whether or not the incoming call history information 83 comprising the incoming phone number which is obtained in task S02, is extracted. If such incoming call history information is extracted, the process is forwarded to task S06; however, if not, the process is forwarded to task S15.

In task S06, the incoming call history information is updated, and the process is forwarded to task S07. More specifically, a value of the number of received times of the incoming call history information extracted in task S05 is changed. In this manner, 1 is added to the number of incoming calls. In task S07, determination is made whether or not additional information is added to the incoming call history information 83 extracted in task S05. If the additional information is added, the process is forwarded to task S08; however, if not, the process is forwarded to task S10.

In task S08, the incoming call history information 83 extracted in task S05 and updated in task S06 is displayed on the LCD 15. The incoming call history information 83 is displayed; and therefore, a user can be reminded of a caller of the incoming call and number of the incoming calls.

Then, a notification is made that the additional information is added (task S09), and the process is forwarded to task S21. More specifically, the additional information is displayed at a location adjacent to a display location of the incoming call history information 83. In the case where the additional information is added to the incoming call history information 83, the additional information is displayed in addition to the incoming call history information 83; and therefore, the additional information can be used as a hint to remind the user of a caller of an incoming call. In addition, since the additional information is information which the user himself/herself set at the completion of a phone call in the past, and the additional information is displayed in addition to the time of an incoming call and the number of incoming calls, it is possible to further remind the user of the caller of the incoming calls. Also, the displayed information may be used as a hint to remind the user of the content of the phone call made in the past.

Instead of displaying only the additional information as explained above, an icon or a mark previously associated with the additional information may be displayed. Further, a predetermined ring alert may be sounded from a speaker, a vibration module 26 may be vibrated in a predetermined pattern, and an e-mail, in which the phone number and the additional information are described and a previously set e-mail address is set to a destination, may be generated and transmitted. A notification can be made that the additional information is set with respect to a caller of the incoming call to the user of the mobile phone 1 by a sound of the ring alert, vibration of the vibration module 26, and the e-mail.

In task S10, an outgoing call history information 82 is searched and determination is made whether or not the outgoing call history information 82 comprising the incoming phone number, the phone number being obtained in task S02, is extracted. If such outgoing call history information 82 is extracted, the process is forwarded to task S11; however, if not, the process is forwarded to task S14. In task S14, the incoming call history information 83 extracted in task S05 is displayed on the LCD 15, and the process is forwarded to task S21. The incoming call history information 83 is displayed; and therefore, the user can be reminded of a caller of a incoming call by taking a hint from the received time of the incoming call and the number of received times.

In task S11, the outgoing call history information 82 extracted in task S10 and the incoming call history information 83 extracted in task S05 are displayed on the LCD 15. The outgoing call history information 82 and the incoming call history information 83 are displayed; and therefore, the user can be reminded of a caller of a incoming call by taking a hint from the initiating time of the outgoing call, the number of times of outgoing calls, the received time of the incoming call, and the number of received times of incoming calls.

Then, determination is made whether or not the additional information is added to the outgoing call history information 82 extracted in task S10 (task S12). If the additional information is added, the process is forwarded to task S13; however, if not, the process is forwarded to task S21.

In step S13, a notification is made that the additional information is added, and the process is forwarded to step S21.

More specifically, the additional information is displayed at a location adjacent to a display location of the outgoing call history information 82. In the case where the additional information is added to the outgoing call history information 82, the additional information is displayed in addition to the incoming call history information 83 and the outgoing call history information 82. Therefore, such additional information can provide a hint as to the identity of the caller. In addition, since the additional information is information that the user himself/herself set at the completion of a phone call made by the user in the past, it becomes easier to inform the user regarding the incoming calls, and give a hint as to the identity of the caller. The additional information is displayed in addition to the incoming call time, the number the incoming calls, the outgoing call time, and the number of outgoing call. Furthermore, a hint for informing the user of the content of the phone call made in the past can be given.

In stead of displaying only the additional information, the icon or the mark previously associated with the additional information may be displayed. Further, the predetermined ring alert may be sounded from the speaker, the vibration module 26 may be vibrated in the predetermined pattern, and the e-mail in which the phone number and the additional information are described and the previously set e-mail address is set to the destination may be generated and transmitted. The notification can be made that the additional information is set with respect to a caller of the incoming call to the user of the mobile phone 1 by the sound of the ring alert, vibration of the vibration module 26, and the e-mail.

On the other hand, in task S15, the incoming call history information is stored, and the process is forwarded to task S16. More specifically, new incoming call history information which comprises the phone number of the incoming call obtained in task S02, and a time at which the incoming call is detected in task S01, and the number of incoming calls is set to "1" is generated and the new incoming call history information is added to the incoming call history information 83 of the non-volatile memory module 31 and stored.

Then, in task S16, as in task S10, the outgoing call history information 82 is searched and determination is made whether or not the outgoing call history information 82 comprising the incoming phone number, the phone number being obtained in task S02, is extracted. If such outgoing call history information 82 is extracted, the process is forwarded to task S17; however, if not, the process is forwarded to task S20. In task S20, a message of "first incoming call" is displayed on the LCD 15, and the process is forwarded to task S21.

In task S17, the outgoing call history information 82 extracted in task S16 is displayed on the LCD 15. The outgoing call history information 82 is displayed; and therefore, the user can be informed of the outgoing calls by taking a hint from the outgoing call time and the number of outgoing calls.

Then, a determination is made whether or not the additional information is added in the outgoing call history information 82 extracted in task S16 (task S18). If the additional information is added, the process is forwarded to task S19; however, if not, the process is forwarded to task S21. In task S19, as in task S13, a notification is made that the additional information is added, and the process is forwarded to task S21.

Figure 6:
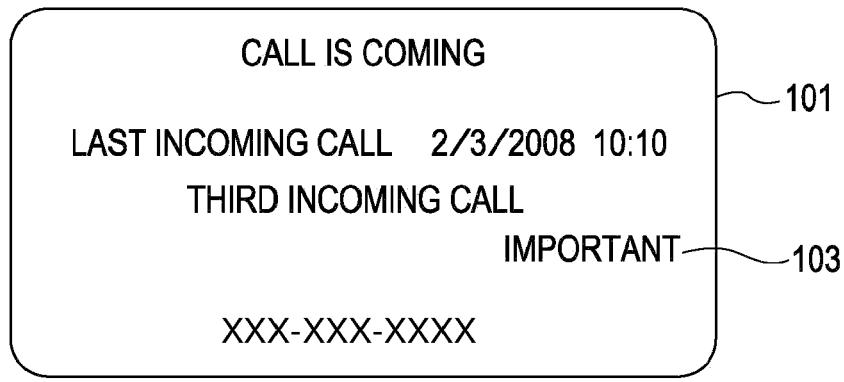
FIG. 6 illustrates an exemplary display screen displayed on an LCD of a mobile phone according to an embodiment of the present invention.

FIG. 6 illustrates an exemplary display screen 101 displayed on the LCD 15 of the display module 2 of the mobile phone 1, when task S08 of the process 500 is executed. A display screen 101 comprises "2008/2/3 10:10" as a incoming call time, "3" as the number of incoming calls, "XXX-XXX-XXXX" as a phone number of the incoming call, and "important" as an additional information 103.

Figure 7:
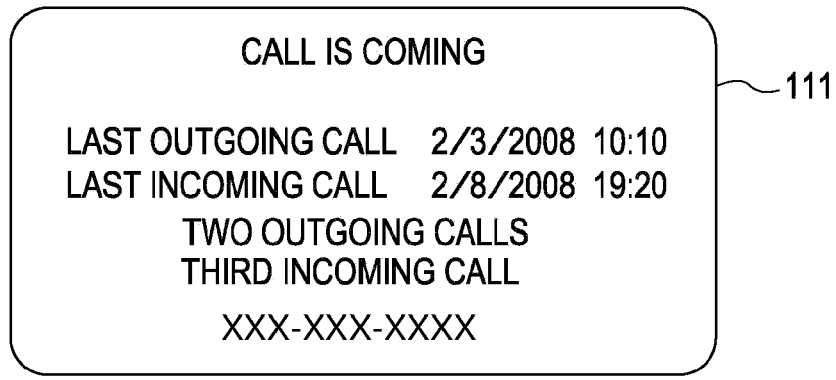
FIG. 7 illustrates an exemplary display screen displayed on an LCD of a mobile phone according to an embodiment of the present invention.

FIG. 7 illustrates an exemplary display screen 111, that is, one example of the screen displayed on the LCD 15 of the display module 2 of the mobile phone 1 when task S11 of the process 500 is executed. Display screen 111 comprises "2008/2/3 19:10" as the incoming call time, "3" as the number of incoming calls, "2008/2/3 10:10" as the outgoing call time, "2" as the number of the outgoing calls, and "XXX-XXX-XXXX" as the phone number of the incoming call.

Figure 8:
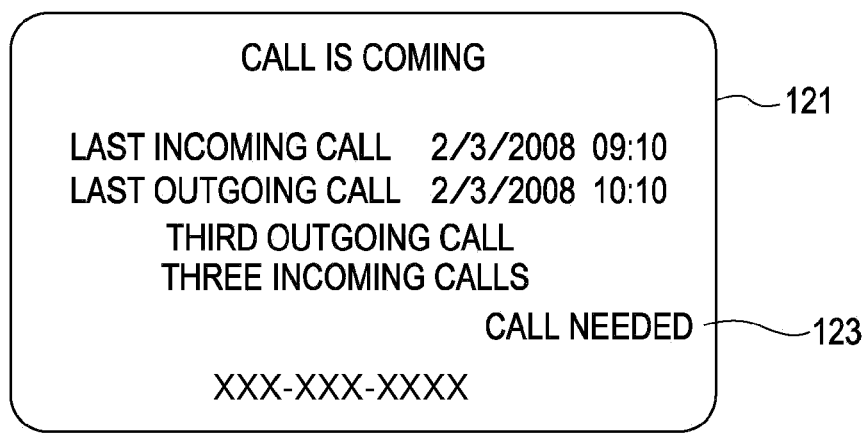
FIG. 8 illustrates an exemplary display screen displayed on an LCD of a mobile phone according to an embodiment of the present invention.

FIG. 8 illustrates an exemplary display screen 121 displayed on the LCD of the display module 2 of the mobile phone 1 when task S13 shown in the process 500 is executed. The display screen 121 is different from the display screen 111 shown in FIG. 7 in that "necessary for a call" as additional information 123 is added.

Figure 9:
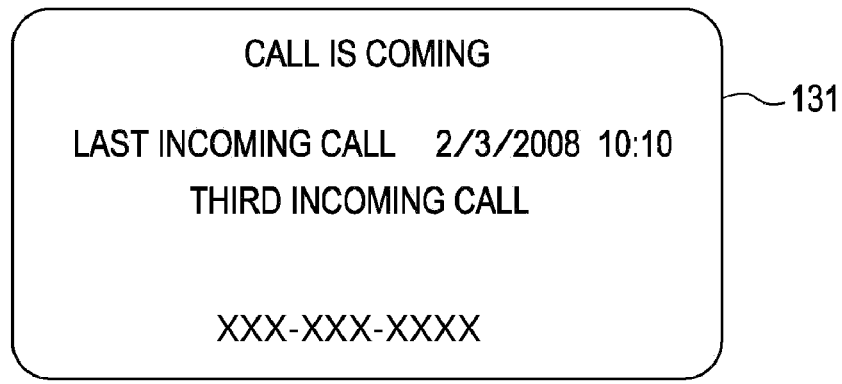
FIG. 9 illustrates an exemplary display screen displayed on an LCD of a mobile phone according to an embodiment of the present invention.

FIG. 9 illustrates an exemplary display screen 131 displayed on the LCD 15 of the display module 2 of the mobile phone 1 when task S14 shown in the process 500 is executed. The display screen 131 comprises "2008/2/3 10:10" as a incoming call time, "3" as the number incoming calls, and "XXX-XXX-XXXX" as a phone number of the incoming call.

Figure 10:
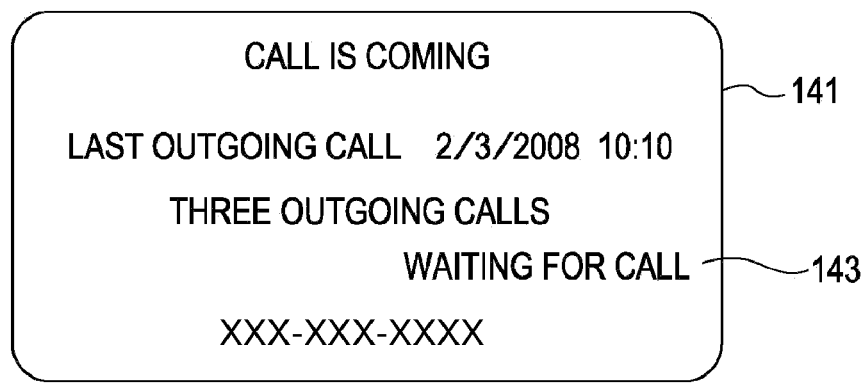
FIG. 10 illustrates an exemplary display screen displayed on an LCD of a mobile phone according to an embodiment of the present invention.

FIG. 10 is illustrates an exemplary display screen 141 displayed on the LCD 15 of the display module 2 of the mobile phone 1 when task S19 of the process 500 is executed. The display screen 141 comprises "2008/2/3 10:10" as an outgoing call time, "3" as the number of outgoing calls, "wait for a call" as an additional information 143, and "XXX-XXX-XXXX" as a phone number of the incoming call.

Figure 11:
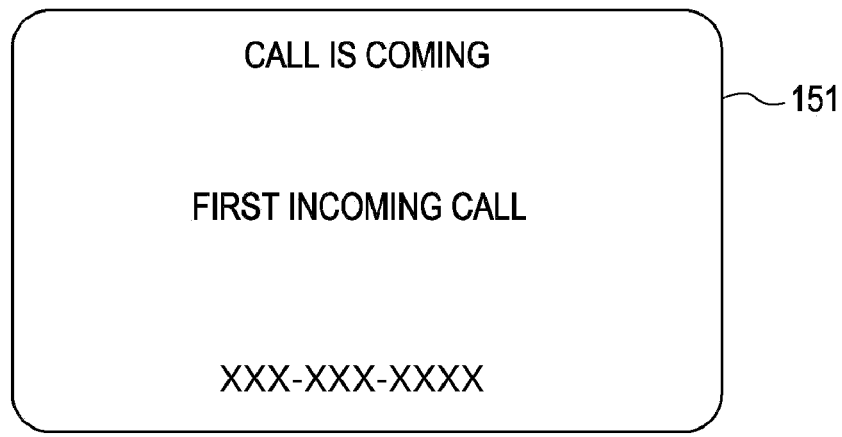
FIG. 11 illustrates an exemplary display screen displayed on an LCD of a mobile phone according to an embodiment of the present invention.

FIG. 11 illustrates an exemplary screen display 151 on the LCD 15 of the display module 2 of the mobile phone 1 when task S20 shown in the process 500 is executed. The display screen 151 comprises a message "first incoming call" and "XXX-XXX-XXXX" as a phone number of the incoming call.

Return to FIG. 5, in task S21, determination is made whether or not an off-hook key of an operational keypad 14 is pressed. If the off-hook key detects pressing, the process is forwarded to task S22; however, if not, the process is completed. In task S22, a network is connected to the wireless communication module 22 to activate a phone call. Then, determination is made whether or not the phone call is completed (task S23). More specifically, determination is made whether or not an on-hook key of the operational keypad 14 is pressed or the network connected to the wireless communication module 22 is cut off. If the pressing of the on-hook key of the operational keypad 14 is detected or if the network connected to the wireless communication module 22 is cut off, the process is forwarded to task S24; however, if not, the process is returned to task S22 and the phone call is continued.

In task S24, the additional information setting screen shown in FIG. 4 is displayed on the LCD 15. Then, determination is made whether or not acceptance of instruction for setting the additional information is made (task S25). If instruction of the additional information is accepted, determination is made that the instruction for setting the additional information is accepted. If the instruction for setting the additional information is accepted, the process is forwarded to task S26; however, if not so, the process is completed.

In task S26, the additional information designated in task S25 is added to the incoming call history information 83 updated in task S06 and the incoming call history information 83 stored in task S15 in the case where the incoming call history information is not extracted in task S05 (NO in task S05) to store the same.

Figure 12:
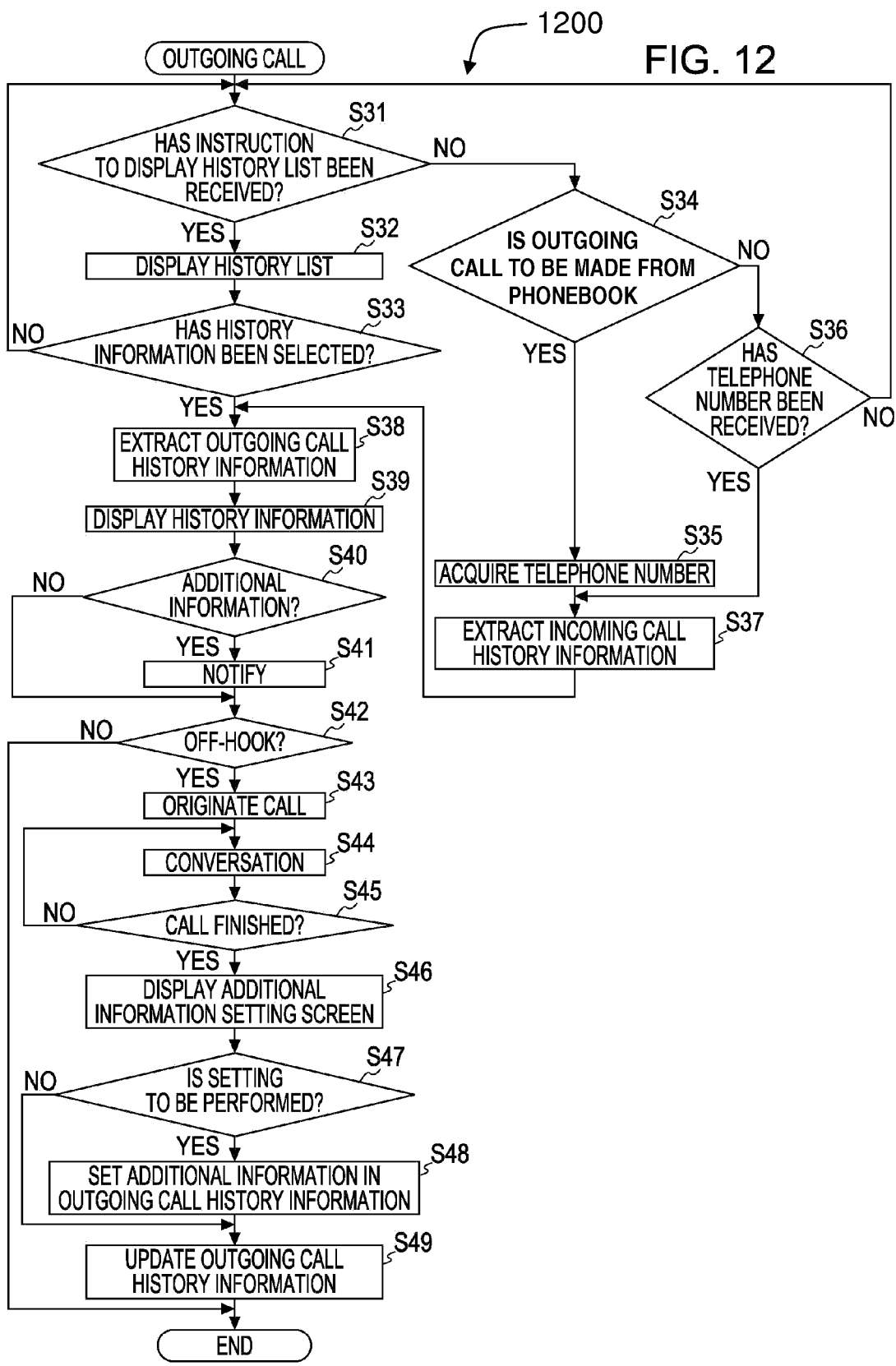
FIG. 12 is a flow chart showing an exemplary call outgoing call process.

FIG. 12 is a flow chart showing an exemplary outgoing call process 1200. The outgoing call process 1200 is a process performed by a control module 21 by executing a communication history display program. The various tasks performed in connection with the process 1200 may be performed by software, hardware, firmware, a computer-readable medium having computer executable instructions for performing the process method, or any combination thereof. It should be appreciated that the process 1200 may include any number of additional or alternative tasks. The tasks shown in FIG. 12 need not be performed in the illustrated order, and these processes may be incorporated into a more comprehensive procedure or process having additional functionality not described in detail herein. For illustrative purposes, the following description of the process 1200 may refer to elements mentioned above in connection with FIGS. 1-4. In various embodiments, portions of the process 1200 may be performed by different elements of systems, e.g., the wireless communication module 22, the control module 21, and the non-volatile memory module 31. The process 1200 is a process executed by a control module 21 by executing a communication history display program.

The process 1200 may begin by the control module 21 determining whether or not a history list display instruction is accepted (task S31). When a user inputs the history display instruction to the operational keypad 14, the history list display instruction is accepted. If the history list display instruction is accepted, the process is forwarded to task S32; however, if not, the process is forwarded to task S34. The history list display instruction comprises instruction for list-displaying incoming call history information 83 and instruction for list-displaying outgoing call history information 82. The difference is whether the incoming call history information 83 or the outgoing call history information 82 is displayed. Therefore, in this case, description is made for an example in which the history list display instruction is an instruction for list-displaying the incoming call history information 83.

In task S32, the incoming call history information 83 is list-displayed on the LCD 15. In one embodiment, when the history list display instruction is a instruction for list-displaying the outgoing call history information 82, the outgoing call history information 82 is list-displayed on the LCD 15. Then, determination is made whether or not instruction for selecting one of the list-displayed incoming call history information 83 is accepted (task S33). If the instruction for selecting one of the incoming call history information 83 is accepted, the process is forwarded to task S38; however, if not so, the process is returned to task S31.

In task S34, determination is made whether or not calling instruction using a phonebook 85 is accepted. When a phone number registered in the phonebook 85 is designated, the calling instruction using the phonebook 85 is accepted. If the calling instruction using the phonebook 85 is accepted, the process is forwarded to task S35; however, if not so, the process is forwarded to task S36. In task S35, the designated phone number of the phone number registered in the phonebook 85 is obtained, and the process is forwarded to task S37.

In task S36, determination is made whether or not the phone number is accepted. If the user inputs the phone number using the operational keypad 14, the phone number is accepted. If the phone number is accepted, the process is forwarded to task S37.

In task S37, the incoming call history information comprising the phone number obtained in task S35 or the phone number accepted in task S36 is extracted from the incoming call history information 83 stored in a non-volatile memory 31, and the process is forwarded to task S37.

In task S38, the outgoing call history information comprising the phone number in the incoming call history information 83 selected in task S33, the phone number obtained from the phonebook 85 in task S35, or the phone number directly inputted by the user accepted in task S36 is extracted from the outgoing call history information 82 stored in the non-volatile memory module 31, and the process is forwarded to task S38. If a history list display instruction is the instruction for list-displaying the outgoing call history information 82, the incoming call history information comprising the phone number in those selected from the list-displayed outgoing call history information 82 is extracted from the incoming call history information 83 stored in the non-volatile memory module 31.

In task S39, the incoming call history information 83 selected in task S33 or the incoming call history information 83 extracted in task S37, and the outgoing call history information 82 extracted in task S33 are displayed on the display module (LCD) 15. The outgoing call history information 82 and the incoming call history information 83 comprising the phone number comprised in the incoming call history information selected by the user, the phone number of the caller selected from the phonebook 85 by the user, or the phone number directly inputted by the user are displayed; and therefore, the user can know a time of the outgoing call and the number of outgoing calls to the intended phone number, and a time of the incoming call and the number of incoming calls from the phone number, thereby allowing the user to be reminded of a caller of the phone number and to identify the same easily.

Then, determination is made whether or not additional information is added to the displayed outgoing call history information 82 or the incoming call history information 83 (task S40). If the additional information is added to the displayed outgoing call history information 82 or the incoming call history information 83, the process is forwarded to task S41; however if not so, task S41 is skipped and the process is forwarded to task S42.

In task S41, a notification is made that the additional information is added, and the process is forwarded to task S42. More specifically, if the additional information is added to the incoming call history information 83, the additional information is displayed at a location adjacent to a display location of the incoming call history information 83; and if the additional information is added to the outgoing call history information 82, the additional information is displayed at a location adjacent to a display location of the outgoing call history information 82. If the additional information is added to the incoming call history information 83 or the outgoing call history information 82, the additional information is displayed in addition to the incoming call history information 83 and the outgoing call history information 82; and therefore, a hint that reminds the user of a receiver of the outgoing call can be given to the user from the additional information.

Instead of displaying the additional information, an icon or a mark previously associated with the additional information may be displayed. Further, the predetermined ring alert may be sounded from the speaker, the vibration module 26 may be vibrated in the predetermined pattern, and an e-mail in which the phone number and the additional information are described and a previously set e-mail address is set to the destination may be generated and transmitted. The notification can be made that the additional information is set with respect to a receiver of the outgoing call to the user of the mobile phone 1 by a sound of the ring alert, vibration of the vibration module 26, and the e-mail.

In task S42, determination is made whether or not an off-hook key of the operational keypad 14 is pressed. If the pressing of the off-hook key is detected, the process is forwarded to task S43; however, if not, the process is completed. In task S43, a wireless communication module 22 is controlled to make the following phone number call, that is, the phone number comprised in the incoming call history information 83 selected in task S33, the phone number obtained from the phonebook 85 in task S35, or the phone number directly inputted by the user accepted in task S36.

In task S44, a network is connected to the wireless communication module 22, thereby enabling a phone call. Then, determination is made whether or not the phone call is completed (task S45). More specifically, determination is made whether or not an on-hook key of the operational keypad 14 is pressed, or the network connected to the wireless communication module 22 is cut off. If the pressing of the on-hook key of the operational keypad 14 is detected, and if the network connected to the wireless communication module 22 is detected to be cut off, the process is forwarded to task S46; however, if not so, the process is returned to task S44, and the phone call is continued.

In task S46, the additional information setting screen shown in FIG. 4 is displayed on the LCD 15. Then, determination is made whether or not instruction for setting the additional information is accepted (task S47). If the instruction for setting the additional information is accepted, the process is forwarded to task S48; however, if not so, task S48 is skipped, and the process is forwarded to task S49.

In task S48, the additional information designated in task S47 is added to the outgoing call history information 82 comprising the phone number comprised in the incoming call history information 83 selected in task S33, the phone number obtained from the phonebook 85 in task S35, or the phone number directly inputted by the user accepted in task S36 to store the same.

Then, in task S49, the outgoing call history information 82 comprising the phone number of an outgoing call is updated, and the process is completed. More specifically, a value of the number of times of outgoing calls of the outgoing call history information 82 comprising the phone number comprised in the incoming call history information 83 selected in task S33, the phone number obtained from the phonebook 85 in task S35, or the phone number directly inputted by the user accepted in task S36, is changed to a value in which 1 is added thereto.

Figure 13:
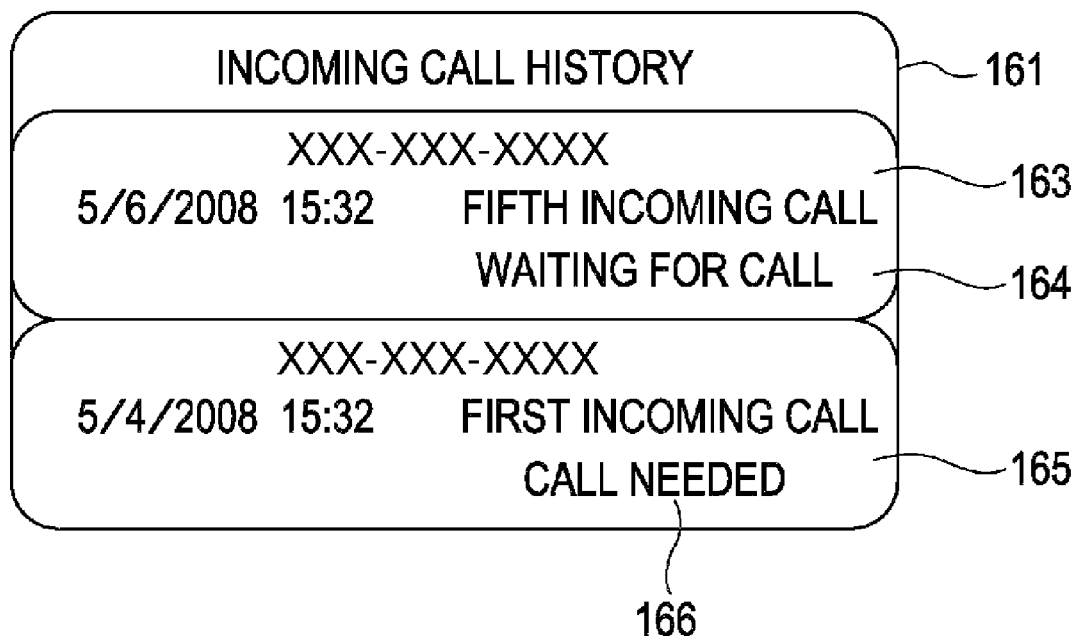
FIG. 13 illustrates an exemplary history list display screen.

FIG. 13 illustrates an exemplary history list display screen. The history list display screen is a screen displayed on the display module 2 of the mobile phone 1 in the case where task S32 shown in FIG. 12 is executed. Referring to FIG. 13, a history list display screen 161 comprises two types of incoming call history information 163 and 165, additional information 164 added to the incoming call history information 163, additional information 166 added to the incoming call history information 165.

Figure 14:
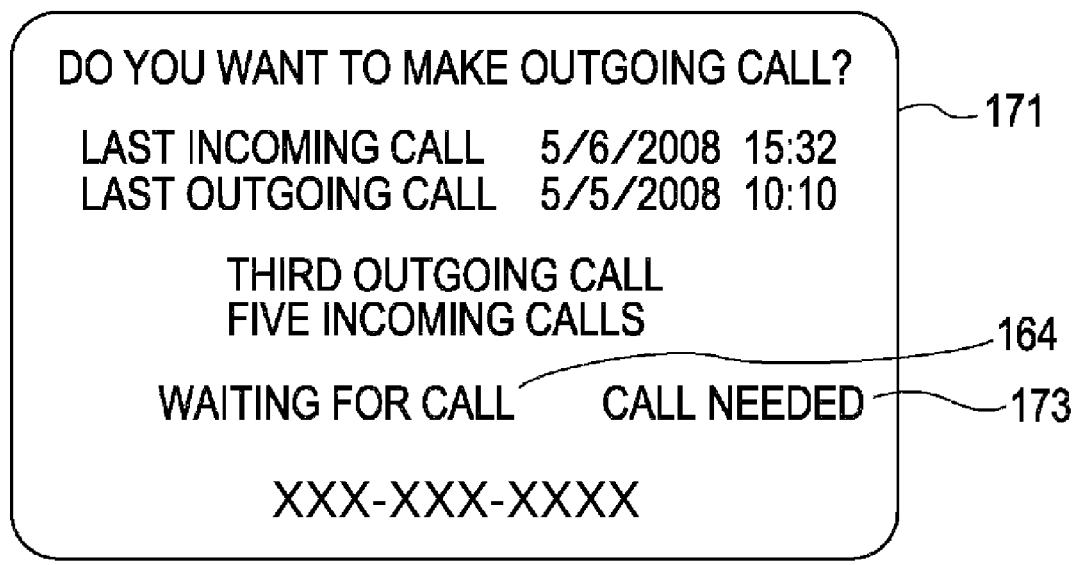
FIG. 14 illustrates an exemplary display screen displayed on an LCD of a mobile phone according to an embodiment of the present invention.

FIG. 14 illustrates an exemplary display screen displayed on the LCD 15 of the display module 2 of the mobile phone 1 in the case where task S39 shown in FIG. 12 is executed. Referring to FIG. 14, a display screen 171 is a screen displayed in the case where the incoming call history information 163 of the history list display screen 161 shown in FIG. 13 is selected. The display screen 171 comprises "2008/5/6 15:32" as a received time serving as the incoming call history information 163 of the history list display screen 161 shown in FIG. 13, "5" as the number of received times, "wait for a call" as the additional information 164, a phone number "XXX-XXX-XXXX" of a caller of the incoming call, "2008/5/6 10:10" as a time of outgoing call serving as outgoing call history information comprising the phone number, "3" as the number of times of outgoing calls, and "necessary for a call" as additional information 173.

As described above, the mobile phone 1 in the present embodiment comprises a phone number of a caller made in the past; history information, which is stored in the history information 81, comprising a time and the phone number of outgoing calls or incoming calls. During receiving an incoming call, the history information comprising a phone number of the current caller of the incoming call is extracted and displayed. Therefore, during receiving the incoming call, the incoming call and a time and the number of the current caller of incoming calls or outgoing calls in the past are displayed as a history; and therefore, a user can be reminded who the caller of the incoming call is from the displayed history and can identify the same.

Besides, during receiving an incoming call, additional information inputted by the user at the completion of the phone call in the past is displayed; and therefore, it becomes possible to remind the user of a caller of an incoming call. The additional information comprises "necessary for a call", "wait for a call", and "an important person", and such information is inputted by the user at the completion of the phone call in the past.

In addition, during receiving a call, in the case where the additional information is set in the history information, a predetermined notification is performed; and therefore, the user can know that the additional information set at the completion of the phone call in the past to a caller of the incoming call remains in existence.

In addition, when the outgoing call history information 82 or the incoming call history information 83 is list-displayed, the incoming call history information 83 or the outgoing call history information 82 comprising the same identification information as the outgoing call history information 82 or the incoming call history information 83 selected by the user, and all the history information of the caller selected by the user are displayed; and therefore, the caller selected by the user can be easily reminded.

In the above described embodiment, description has been made for an example of the mobile phone 1 as one example of communication device; however, embodiments of the present invention can be used as a communication history display method for executing the process shown in FIG. 5 and FIG. 12 or a communication history display program in which the communication history display method is made to execute the control module 21 that controls the mobile phone 1.

The communication history information comprises outgoing call history information comprising a set of identification information of a receiver of the outgoing call in the past and incoming call history information comprising a set of identification information of a caller of the incoming call in the past.

The setting module 55 sets at least one selection by a user from a previous set of additional information to the communication history information. The personal information may be, for example but without limitation, a name, and the like. The set of identification information may, for example but without limitation, a phone number, or the like.

While at least one exemplary embodiment has been presented in the foregoing detailed description, the present invention is not limited to the above-described embodiment or embodiments. Variations may be apparent to those skilled in the art. In carrying out the present invention, various modifications, combinations, sub-combinations and alterations may occur in regard to the elements of the above-described embodiment insofar as they are within the technical scope of the present invention or the equivalents thereof. The exemplary embodiment or exemplary embodiments are examples, and are not intended to limit the scope, applicability, or configuration of the invention in any way. Rather, the foregoing detailed description will provide those skilled in the art with a template for implementing the exemplary embodiment or exemplary embodiments. It should be understood that various changes can be made in the function and arrangement of elements without departing from the scope of the invention as set forth in the appended claims and the legal equivalents thereof. Furthermore, although embodiments of the present invention have been described with reference to the accompanying drawings, it is to be noted that changes and modifications may be apparent to those skilled in the art. Such changes and modifications are to be understood as being included within the scope of the present invention as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A communication device, comprising:
   a memory module operable to store a set of call history information which comprises a set of identification information of callers in the past;
   an extraction module operable to extract a subset of the set of call history information related to at least one of the callers in the past stored in the memory module during a phone call to extract history information;
   a display module operable to display the extracted history information;
   a setting module operable to receive a set of accepted additional information at an end of the phone call, and to place the set of accepted additional information in the set of call history information; and
   a notification module operable to notify a user of a first notification if the set of accepted additional information is stored in the extracted history information, and not notify the user of the first notification if the set of accepted additional information is not stored in the extracted history information;
   wherein the display module is further operable to display the set of accepted additional information, if the set of accepted additional information is stored in the extracted history information.

2. The communication device according to claim 1, wherein notifying the user of the first notification comprises at least one of: displaying an icon or a mark associated with the set of accepted additional information, sounding a predetermined sound, vibrating the communication device, or transferring the set of accepted additional information to a device.

3. The communication device according to claim 1, wherein the set of accepted additional information comprises information which specifies a notification type for notifying a user of predetermined information.

4. The communication device according to claim 1, wherein the extraction module is further operable to extract the set of call history information comprising the set of identification information selected by a user of the communication device, if the set of call history information stored in the memory module is list-displayed.

5. The communication device according to claim 1, wherein, if a plurality of sets of history information is extracted by the extraction module the display module is further operable to display the plurality of sets of extracted history information.

6. The communication device according to claim 1, further comprising an update module operable to update a number of phone calls by counting the number of the communication, if the set of communication history information stored in the memory module already has the same identification information.

7. The communication device according to claim 1, wherein the memory module is further operable to store personal information corresponding to the set of identification information, and the display module is further operable to display the personal information.

8. The communication device according to claim 1, wherein the phone call comprises receiving or transmitting a call or the combination thereof.

9. A method for displaying communication history information, the method comprising:
   storing a set of call history information comprising a set of identification information of callers in the past in a memory module;
   extracting call history information related to at least one of the callers in the past, stored in the memory module during phone call, from the set of call history information to obtain extracted history information;
   displaying the extracted history information on a display;
   receiving a set of accepted additional information at an end of the phone call, and placing the set of accepted additional information in the set of call history information; and
   notifying a user of a first notification if the set of accepted additional information is stored in the extracted history information, and not notifying the user of the first notification if the set of accepted additional information is not stored in the extracted history information;
   displaying the set of accepted additional information, if the set of accepted additional information is stored in the extracted history information.

10. A non-transitory computer readable medium storing program code that when executed by a computer performs a method for displaying communication history information, the method comprising:

storing a set of communication history information comprising a set of identification information of callers in the past in a memory module;

extracting a subset of the set of call history information related to at least one of the callers in the past, stored in the memory module during a phone call, from the set of communication history information in the memory module to obtain extracted history information;

displaying the extracted history information on a display;

receiving a set of accepted additional information at an end of the phone call, and placing the set of accepted additional information in the set of call history information; and notifying a user of a first notification if the set of accepted additional information is stored in the extracted history information, and not notifying the user of the first notification if the set of accepted additional information is not stored in the extracted history information;

displaying the set of accepted additional information, if the set of accepted additional information is stored in the extracted history information.

* * * * *